Patented Dec. 5, 1950

2,532,579

UNITED STATES PATENT OFFICE 2,532,579

PEST CONTROL COMPOSITIONS CONTAINING BETA-ACYL ACRYLATES

John C. Thomas, Wilmington, Del., assignor to E. I. du Pont de Nemours & Company, Wilmington, Del., a corporation of Delaware No Drawing. Application August 6, 1946,
Serial No. 688,716

10 Claims. (Cl. 167—22)

This invention relates to pest control and to a method of disinfecting and preserving organic matter from pests. More particularly this invention relates to new pest control compositions for the control of bacteria, fungi and insects and to products containing bacteriostatic agents.

Heretofore, the dialkyl maleates and fumarates and the maleimides have been known to possess pesticidal properties against bacteria and fungi. However, these materials possess disadvantages in that their bactericidal properties are not sufficiently pronounced in dilute solutions.

It is an object of the present invention to provide new and effective pest control compositions for controlling economically harmful lower forms of life, such as bacteria, fungi and insects which prey on living and non-living organic matter, whether such matter is in its natural or fabricated state. A further object of this invention is to provide new pesticidal compositions which are highly effective in dilute solutions. A still further object is to provide bacteriostatic compositions which are highly effective in destroying or preventing the growth of bacteria, fungi and related organisms. A principal object of this invention is to disinfect and preserve plant and animal matter, whether in the natural or fabricated state, with new pesticidal compositions.

These objects are accomplished by a pest control composition comprising, as an essential active ingredient, a beta-acyl acrylate having the formula R—COCH=CHCOOR' where R is monovalent and a member of the group consisting of alkyl, cycloalkyl, aryl, chloroaryl and heterocyclic radicals and R' is monovalent and a member of the group consisting of aryl, aralkyl, heterocyclic, cycloalkyl and aliphatic hydrocarbon radicals. In a preferred embodiment R and R' are alkyl of from 1 to 6 carbon atoms. A dilute concentration of the beta-acyl acrylate in a carrier when brought in contact with the microorganism (bacteria, fungi or insects) produces a lethal effect. Products subject to attack by microorganisms are protected therefrom by contact with or incorporation therein of a microorganism devitalizing composition or bacteriostatic agent comprising the beta-acyl acrylate.

This invention is further illustrated by the following examples wherein the quantities, unless otherwise specified, are stated in parts by weight.

Example I

Bacteriostatic titers for ethyl beta-benzoylacrylate were determined for Staphylococcus aureus. The test which was used was conducted in the following manner: 5 cc. of double strength nutrient broth (Bacto Beef Extract—6 g., Bacto Peptone—10 g., distilled water 1000 cc.) inoculated with Staphylococcus aureus was added to 5 cc. of a solution of known dilution of the test compound. The resulting solution therefore contained the test compound in a dilution twice as great as did the original solution. For example if 5 cc. of double strength broth is added to 5 cc. of a 1:1000 dilution of the test compound, the final solution will be 10 cc. of a regular nutrient broth containing 1:2000 dilution of the test compound. The tubes so prepared were then incubated for 48 hours at 37° C. and read either positive (+) or negative (—) indicating growth (+) or no growth (—) of the organism.

The inoculum used above was 0.1 cc. of 24 hour Food and Drug Administration strain of Staphylococcus aureus to 100 cc. of the regular strength nutrient broth.

Under the conditions of this test the above beta-acyl acrylate prevented growth of Staphylococcus aureus at aqueous dilutions of 1:256,000.

Both the ethyl and methyl esters of beta-acetylacrylic acid were similarly bacteriostatic at 1:64,000 whereas the parent acid, showed no bacteriostatic activity at 1:4000. A concentration of 1:2000 of this acid was necessary to prevent growth of the Staphylococcus aureus.

At an aqueous dilution of 1:2000 neither diethyl maleate nor diethyl fumarate showed bacteriostatic activity against Staphylococcus aureus.

Example II

Ethyl beta-acetylacrylate effectively controls Aspergillus niger at a dilution of 1:32,000, and at a dilution of 1:16,000 the same product effectively controls Penicillium sp.

In contrast to the fungicidal activity of the beta-acyl acrylates of this invention, it was found necessary to employ the relatively high concentrations of 1:250 of diethyl maleate to give effective controls of Penicillium sp. and Aspergillus niger. Likewise, a concentration of 1:1000 of dimethyl fumarate appeared to be necessary to give fungicidal control of the same two organisms.

The beta-acyl acrylates of this invention are also effective fungicides against a variety of other fungi including Trichoderma sp., Rhizoctonia solani, Lenzites trabea, Alternaria solani, and Ceratostomella pilifera.

Example III

The pesticidal activity of the compounds of this invention is further illustrated with the n-butyl ester of beta-acetylacrylic acid which when sprayed as a 1% acetone solution against the bean aphid gave a 100% kill of this pest.

The same concentration of dimethyl fumarate in acetone sprayed against this bean aphid resulted in only a 26% kill of this insect. Similarly, a 1% acetone solution of the n-butyl beta-acetylacrylate when sprayed against red spider is an effective insecticide killing 85% of this mite, whereas dimethyl fumarate, under similar conditions and at the same concentration, showed only a 5% mortality of this mite.

Beta-benzoylacrylic acid was prepared by the method of Von Pechmann, Ber. 15, 885 (1882) and this acid was esterified to the ethyl beta-benzoylacrylate with ethanol in the presence of hydrochloric acid catalyst. The methyl and ethyl esters of beta-acetylacrylic acid were prepared by the method of Pauly et al., Ann. 403, 150 (1914) from methyl and ethyl bromolevulinates, respectively. By the method of alcoholysis various esters of the beta-acyl acrylic acids can be prepared, e. g., by ester-interchange of the above lower alkyl beta-acyl acrylates with the desired alcoholic compounds such esters as n-butyl, n-dodecyl and the like can be derived. Ester-interchange catalysts which may be employed include mineral acids, litharge, sodium or potassium alcoholates and the like.

It is to be understood that other esters of various beta-acyl-substituted acrylic acids, aside from those specifically mentioned in the examples, are contemplated in this invention. The acyl substituents in these compounds are derived from aliphatic, aryl and heterocyclic carboxylic acids and may include, aside from the acetyl of the examples, propionyl, butyryl, benzoyl, hexahydrobenzoyl, furoyl, tetrahydrofuroyl, thenoyl, beta-(1-naphthoyl), and beta-(2-naphthoyl).

Esters of the above beta-acyl-substituted acrylic acids which are contemplated in this invention include the methyl, ethyl, n-propyl, isopropyl, butyl, isobutyl, amyl, hexyl, heptyl, octyl, decyl, dodecyl, cyclohexyl, tetrahydrofurfuryl, allyl, methallyl, benzyl and phenyl.

As illustrative of the compounds which may be employed in this invention the following specific examples are mentioned: the propyl, cyclohexyl, tetrahydrofurfuryl, and benzyl esters of beta-acetylacrylic acid, the methyl and ethyl esters of beta-propionylacrylic, beta-(p-chlorobenzoyl) acrylic, and beta-benzoylacrylic acids, the allyl and methallyl esters of beta-(1-naphthoyl) acrylic acid, and the ethyl and tetrahydrofurfuryl esters of beta-thienoylacrylic acid.

Particularly preferred embodiments of this invention contain alkyl of not more than 6 carbon atoms for the alkyl and aliphatic hydrocarbon classes; thienyl (C₄H₃S—) and furfuryl

radicals for the heterocyclic class; phenyl for the aryl class; chlorophenyl for the chloroaryl class; and cyclohexyl for the cycloalkyl class.

In general, the active agents of this invention may be formulated in a wide variety of ways as may be best suited to the control of any particular pest or combination of pests, having in mind the nature of the pest, its particular habitat and feeding habits, and its peculiar susceptibilities. Thus suitable compositions may be prepared with the active agent in state of composition, sub-division, and association with such other materials as carriers as may be necessary peculiarly to adapt the active agent to the purpose to be effected.

The compounds of this invention may be used in various combinations with such carriers or auxiliary materials as solvents, spreaders, stickers and other toxicants; for example with insecticides such as organic thiocyanates, rotenone, pyrethrum, phenothiazine, hexachlorocyclohexanes, 2,2 - bis(p - chlorophenyl) - 1,1,1 - trichloroethane, 2,2 - bis(p - methoxy) - 1,1,1 - trichloroethane, with bactericides and fungicides such as the chlorinated phenols, the chlorinated cresols, the mercurial bactericides such as Metaphen, the copper acrylates, copper chelates of salicylaldehyde, the long chain quaternary ammonium halides and derivatives of dithiocarbamic acid, such as ferric dimethyl dithiocarbamate.

They may be used in the form of aqueous sprays, dusts or solutions, dispersed with wetting agents such as the alkali metal or amine salts of oleic acid and the sulfated higher alcohols, the sulfonated animal and vegetable oils such as sulfonated fish or caster oil or the sulfonated petroleum oils; with diluents such as calcium phosphate, Bancroft clay, kaolin, diatomaceous earth, pyrophyllite, talc, bentonite, flours such as walnut shell, wheat, redwood, soya bean, cottonseed, or with solvents such as water, alcohol, acetone, and hydrocarbon solvents. Such mixtures as are here set out may have particular usefulness in special applications and frequently will give better results than may be obtained from the pesticidal action of the ingredients when used alone.

The compounds of this invention are particularly useful as bacteriostatic agents and fungicides. Thus the agents of this invention may be used to especial advantage as preservatives for such substances as raw hide, glue, gelatin, leather, cellulosic substances, casein products, and other natural or manufactured products that are subject to attack or decomposition by various bacteria and molds.

The term "fungicide" and "insecticide" as used herein shall, except as otherwise qualified, be construed in accordance with the insecticide act of 1910, section 6 and the regulations for its enforcement (issued October 1941, U. S. Department of Agriculture). The term "pest control" shall, except as otherwise qualified, be construed in accordance with the U. S. Patent 2,165,030 (issued July 4, 1939, and filed May 20, 1937).

As many apparently widely different embodiments of this invention may be made without departing from the spirit and scope thereof, it is to be understood that I do not limit myself to the specific embodiments thereof except as defined in the appended claims.

I claim:

1. A pest control composition comprising in aqueous medium a wetting agent and, as an essential active ingredient therein, an alkyl beta-chloroaroyl acrylate having the formula RCOCH=CHCOOR', where R is chloroaryl and R' is alkyl containing from 1 to 6 carbon atoms.

2. A pest control composition comprising in aqueous medium a wetting agent and, as an essential active ingredient therein, an alkyl beta-aroyl acrylate having the formula RCOCH=CHCOOR', where R is aryl and R' is alkyl containing from 1 to 6 carbon atoms.

3. The pest control composition set forth in claim 2 where R is phenyl.

4. A pest control composition comprising in aqueous medium a wetting agent and, as an essential active ingredient therein, ethyl beta-benzoylacrylate.

5. A pest control composition comprising in aqueous medium a wetting agent and, as an essential active ingredient therein, an alkyl beta-acetylacrylate having the formula $CH_3COCH=CHCOOR'$ where $R'$ is alkyl containing from 1 to 6 carbon atoms.

6. A pest control composition comprising in aqueous medium a wetting agent and, as an essential active ingredient therein, a beta-acyl acrylate having the formula $RCOCH=CHCOOR'$ where R is a member of the group consisting of aryl radicals, chloroaryl radicals, and alkyl radicals containing from 1 to 6 carbon atoms and $R'$ is a member of the group consisting of aryl radicals and alkyl radicals containing from 1 to 6 carbon atoms.

7. The pest control composition set forth in claim 1 where R is chlorophenyl and $R'$ is alkyl containing from 1 to 6 carbon atoms.

8. A pest control composition comprising in aqueous medium a wetting agent and, as an essential active ingredient therein, ethyl beta-(p-chlorobenzoyl)acrylate.

9. A pest control composition comprising in aqueous medium a wetting agent and, as an essential active ingredient therein, methyl beta-(p-chlorobenzoyl)acrylate.

10. A pest control composition comprising in aqueous medium a wetting agent and, as an essential active ingredient therein, ethyl beta-acetylacrylate.

JOHN C. THOMAS.

REFERENCES CITED

The following references are of record in the file of this patent:

UNITED STATES PATENTS

| Number | Name | Date |
|---|---|---|
| 2,305,558 | Roblin | Dec. 15, 1942 |
| 2,381,886 | Cupery | Aug. 14, 1945 |
| 2,404,929 | Seymour | July 30, 1946 |

OTHER REFERENCES

Worrall: Medical World (London ed.), January 11, 1946, pages 687–688.